(12) United States Patent
Balta et al.

(10) Patent No.: US 9,713,831 B2
(45) Date of Patent: Jul. 25, 2017

(54) CHOPPER AND EXTERNAL WELD BEAD REMOVAL SYSTEM INCLUDING SAME

(71) Applicant: Quartz Matrix, LLC, Sylva, NC (US)

(72) Inventors: Marian Martin Balta, Sylva, NC (US); Gheorghe Mihailescu, Southampton, PA (US)

(73) Assignee: Quartz Matrix, LLC, Sylva, NC (US)

(*) Notice: Subject to any disclaimer, the term of this patent is extended or adjusted under 35 U.S.C. 154(b) by 570 days.

(21) Appl. No.: 14/331,917

(22) Filed: Jul. 15, 2014

(65) Prior Publication Data

US 2015/0059549 A1     Mar. 5, 2015

Related U.S. Application Data

(60) Provisional application No. 61/871,574, filed on Aug. 29, 2013.

(51) Int. Cl.
    *B23P 23/02*      (2006.01)
    *B21C 37/06*      (2006.01)
    (Continued)

(52) U.S. Cl.
    CPC .......... *B21C 37/0811* (2013.01); *B23D 19/02* (2013.01); *B23D 79/021* (2013.01);
    (Continued)

(58) Field of Classification Search
    CPC ......... B21C 37/06–37/09; B23D 79/02–79/06; Y10T 409/501148; Y10T 29/5182;
    (Continued)

(56) References Cited

U.S. PATENT DOCUMENTS 5,192,013 A      3/1993   Abbey, III
5,368,218 A  *  11/1994   Omura ................ B21C 37/0811
                                                  228/125
(Continued)

FOREIGN PATENT DOCUMENTS

DE        4218363 A1  *  12/1993
JP      61-209811 A   *   9/1986
(Continued)

OTHER PUBLICATIONS

Machine Translation JP 62-277213-A, which JP '213 was published Dec. 1987.*

*Primary Examiner* — Erica E Cadugan
(74) *Attorney, Agent, or Firm* — Myers Bigel, P.A.

(57) ABSTRACT

An external weld bead removal system for removing and chopping an external weld bead from a tube includes a weld bead cutting apparatus and a weld bead chopper apparatus for chopping the removed external weld bead. The weld bead cutting apparatus includes a cutting tool operative to cut and remove an external weld bead from a tube. The weld bead chopper apparatus, the weld bead chopper apparatus includes a first blade member, a second blade member mounted adjacent the first blade member, and a chopper actuator operable to forcibly rotate the first blade member about a rotation axis relative to the second blade member such that the first and second blade members cooperatively cut the removed external weld bead into smaller weld bead segments as the removed external weld bead is advanced through the chopper apparatus.

16 Claims, 12 Drawing Sheets

(51) Int. Cl.
*B23D 79/12* (2006.01)
*B23D 19/02* (2006.01)
*B21C 37/08* (2006.01)
*B23D 79/02* (2006.01)

(52) U.S. Cl.
CPC ............ *B23P 23/02* (2013.01); *Y10T 29/5182* (2015.01); *Y10T 29/5199* (2015.01); *Y10T 83/0207* (2015.04); *Y10T 83/202* (2015.04); *Y10T 83/788* (2015.04); *Y10T 409/50164* (2015.01); *Y10T 409/501148* (2015.01)

(58) Field of Classification Search
CPC ............ Y10T 29/5199; Y10T 29/5185; Y10T 409/501476; Y10T 409/501968; Y10T 409/501804; B23K 37/08; B23P 23/02
USPC ........... 409/295, 297–300; 228/125, 13, 160, 228/141.1–162; 29/33 A, 33 T, 33 D
See application file for complete search history.

(56) References Cited

U.S. PATENT DOCUMENTS

| | | | |
|---|---|---|---|
| 6,158,646 A * | 12/2000 | Calvo, Sr. ........... | B21C 37/0811 228/125 |
| 7,490,391 B2 | 2/2009 | Chezzi et al. | |
| 7,988,029 B2 * | 8/2011 | Gleason ................ | B23K 37/08 228/125 |
| 2006/0072973 A1 * | 4/2006 | Micali ................ | B21C 37/0811 407/2 |
| 2013/0098220 A1 | 4/2013 | Seminew | |

FOREIGN PATENT DOCUMENTS

| | | | |
|---|---|---|---|
| JP | 62-236647 A | * | 10/1987 |
| JP | 62-277213 A | * | 12/1987 |
| JP | 2001-239424 A | * | 9/2001 |

* cited by examiner

CHOPPER AND EXTERNAL WELD BEAD REMOVAL SYSTEM INCLUDING SAME

RELATED APPLICATION(S)

The present application claims the benefit of and priority from U.S. Provisional Application No. 61/871,574, filed Aug. 29, 2013, the disclosure of which is incorporated herein by reference in its entirety.

FIELD OF THE INVENTION

The present invention relates to external weld bead removal and, more particularly, to external weld bead removal apparatus and methods including choppers for cutting a removed weld bead.

BACKGROUND OF THE INVENTION

Tubes (e.g., pipes) are commonly manufactured by rolling a sheet of metal into a generally tubular shape and forming a longitudinal seam weld along the opposing longitudinal edges of the rolled metal sheet. The seam weld bonds the opposing edges and completes the tube. However, the seam weld typically includes an undesirable, longitudinally extending, external, excess weld bead. It is known to remove this external weld bead using a scarfing machine. The scarfing machine may include a cutting tool that continuously cuts or planes the external weld bead from the tube to form a continuous removed weld bead strip or ribbon. In some cases, the removed weld bead strip is directed to a chopper that chops or cuts the strip into smaller, discrete segments.

SUMMARY OF THE INVENTION

According to embodiments of the invention, an external weld bead removal system for removing and chopping an external weld bead from a tube includes a weld bead cutting apparatus and a weld bead chopper apparatus for chopping the removed external weld bead. The weld bead cutting apparatus includes a cutting tool operative to cut and remove an external weld bead from a tube. The weld bead chopper apparatus includes a first blade member, a second blade member mounted adjacent the first blade member, and a chopper actuator operable to forcibly rotate the first blade member about a rotation axis relative to the second blade member such that the first and second blade members cooperatively cut the removed external weld bead into smaller weld bead segments as the removed external weld bead is advanced through the chopper apparatus.

In some embodiments, the external weld bead removal system is configured such that the second blade member remains stationary when the first blade member is forcibly rotated by the actuator to cut the removed external weld bead.

According to some embodiments, the chopper actuator is operable to repetitively reciprocate the first blade member in opposed rotation and counter-rotation directions about the rotation axis relative to the second blade member such that the first and second blade members cooperatively cut the removed external weld bead into smaller weld bead segments as the removed external weld bead is advanced through the chopper apparatus.

In some embodiments, the first blade member is rotatively driven at the rotation axis.

According to some embodiments, the chopper actuator includes a drive shaft that linearly reciprocates along a stroke axis, the weld bead chopper apparatus includes a linkage coupling the drive shaft to the first blade member, and the linkage converts the linear movement of the drive shaft to rotation of the first blade member about the rotation axis. In some embodiments, the linkage includes an elongate guide slot to reduce or eliminate lateral loads on the drive shaft as the drive shaft travels through its stroke path along the stroke axis.

According to some embodiments, the first blade member includes first and second sets of cutting edges, and the first blade member can be alternatively positioned to cut the removed external weld bead using either the first set of cutting edges or the second set of cutting edges. In some embodiments, the first and second sets of cutting edges are on opposed sides of the first blade member.

In some embodiments, the first and second sets of cutting edges are on the same side of the first blade member and circumferentially spaced apart about the rotation axis.

According to some embodiments, the second blade member includes first and second sets of cutting edges, and the second blade member can be alternatively positioned to cut the removed external weld bead using either the first set of cutting edges or the second set of cutting edges. In some embodiments, the first and second sets of cutting edges are on opposed sides of the second blade member and define an opening extending through the second blade member. In some embodiments, the first and second sets of cutting edges define respective first and second openings extending through the second blade member, and the first and second openings are circumferentially spaced apart about the rotation axis.

The external weld bead removal system may include a guide chute configured to direct the removed external weld bead to a cutting region between the first and second blade members. In some embodiments, the weld bead chopper apparatus includes a base supporting the second blade member, and the guide chute is removably and replaceably mounted on the base.

The external weld bead removal system may include a tool positioning actuator operative to raise and lower the cutting tool and the weld bead chopper apparatus relative to the tube.

According to embodiments of the invention, a weld bead chopper apparatus for chopping a removed external weld bead from a tube includes a first blade member, a second blade member mounted adjacent the first blade member, and a chopper actuator operable to forcibly rotate the first blade member about a rotation axis relative to the second blade member such that the first and second blade members cooperatively cut the removed external weld bead into smaller weld bead segments as the removed external weld bead is advanced through the chopper apparatus.

According to method embodiments of the invention, a method for removing an external weld bead from a tube includes: cutting and removing an external weld bead from a tube using a cutting tool of a weld bead cutting apparatus; and chopping the removed external weld bead using a weld bead chopper apparatus. The weld bead chopper apparatus includes a first blade member, a second blade member mounted adjacent the first blade member, and a chopper actuator. The chopper actuator forcibly rotates the first blade member about a rotation axis relative to the second blade member such that the first and second blade members cooperatively cut the removed external weld bead into smaller weld bead segments as the removed external weld bead is advanced through the chopper apparatus.

According to embodiments of the invention, a weld bead chopper apparatus for chopping a removed external weld bead from a tube includes a first blade member, a second blade member mounted adjacent the first blade member, and a chopper actuator operable to forcibly move the first blade member relative to the second blade member such that the first and second blade members cooperatively cut the removed external weld bead into smaller weld bead segments as the removed external weld bead is advanced through the chopper apparatus. The first blade member includes first and second sets of cutting edges, and the first blade member can be alternatively positioned to cut the removed external weld bead using either the first set of cutting edges or the second set of cutting edges, and/or the second blade member includes first and second sets of cutting edges, and the second blade member can be alternatively positioned to cut the removed external weld bead using either the first set of cutting edges or the second set of cutting edges.

In some embodiments, the first blade member includes first and second sets of cutting edges, and the first blade member can be alternatively positioned to cut the removed external weld bead using either the first set of cutting edges or the second set of cutting edges, and also the second blade member includes first and second sets of cutting edges, and the second blade member can be alternatively positioned to cut the removed external weld bead using either the first set of cutting edges or the second set of cutting edges.

Further features, advantages and details of the present invention will be appreciated by those of ordinary skill in the art from a reading of the figures and the detailed description of the embodiments that follow, such description being merely illustrative of the present invention.

DETAILED DESCRIPTION OF EMBODIMENTS OF THE INVENTION

Figure 1:
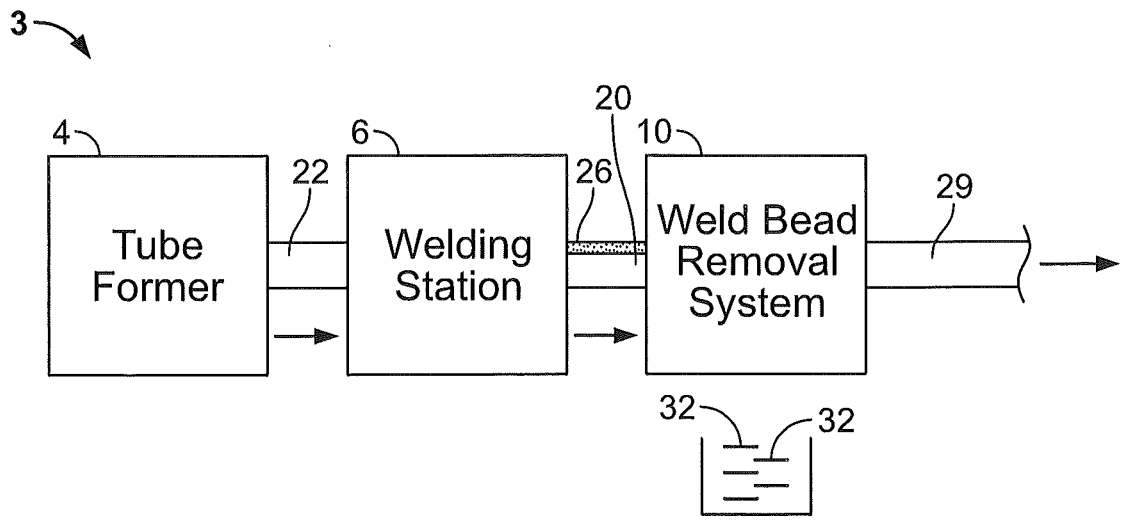
FIG. 1 is a schematic diagram representing a tube fabrication system including an external weld bead removal system according to embodiments of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

As used herein, "monolithic" means an object that is a single, unitary piece formed or composed of a material without joints or seams.

The present invention is directed to a chopper for a removed weld bead and a weld bead removal system including the same. According to some embodiments, the removal system includes the chopper and an excess weld cutting assembly (a scarfing machine) that removes an external excess weld bead as a continuous strip or ribbon from a workpiece (such as a longitudinally welded pipe or tube). The removed ribbon is continuously directed or fed to the chopper, which chops the ribbon into discrete pieces. Chopping the ribbon into pieces in this manner can reduce the risk that the ribbon may become jammed, resulting in work stoppage and/or risk to an operator.

Figure 3:
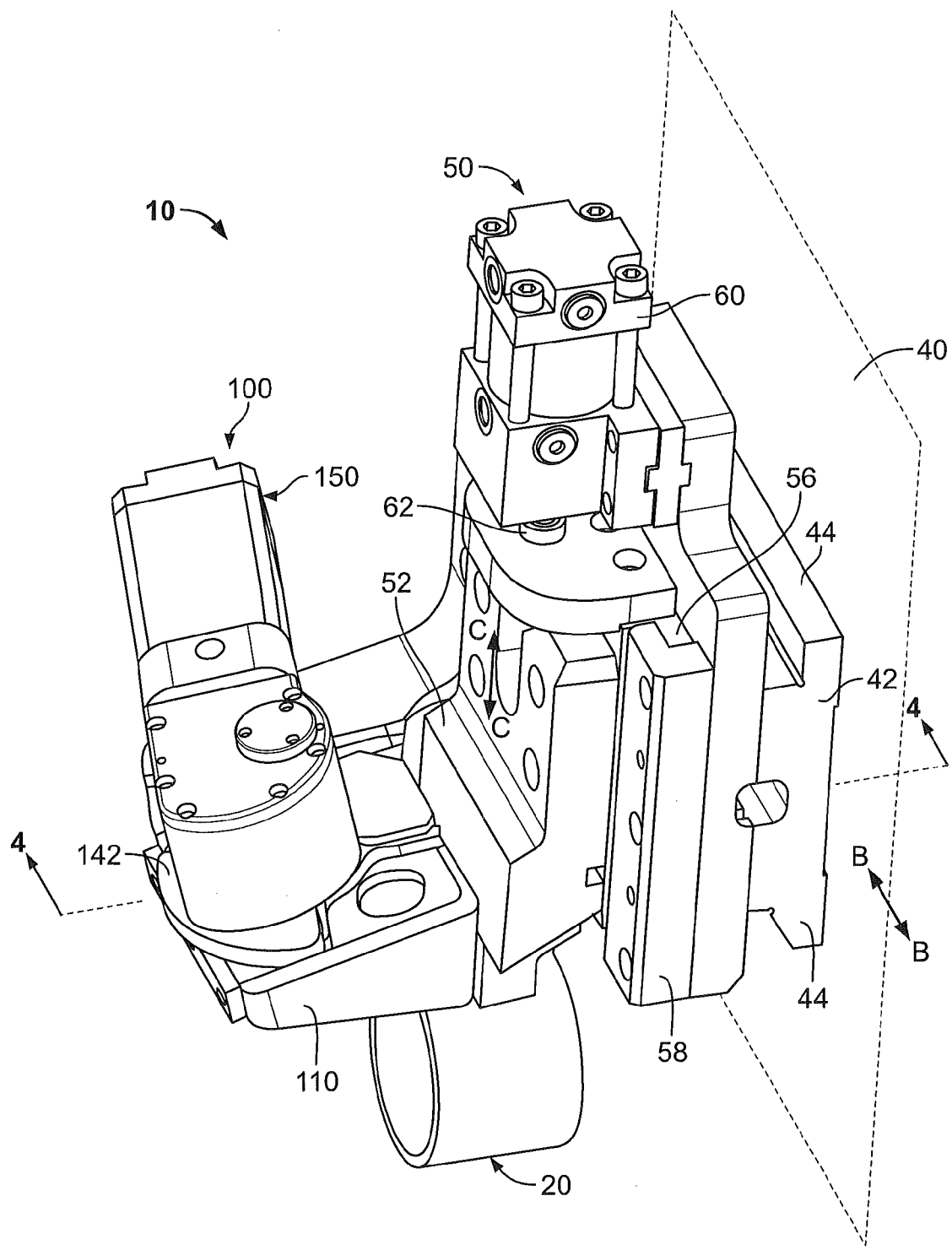
FIG. 3 is a fragmentary, perspective view of the external weld bead removal system of FIG. 1.
Figure 4:
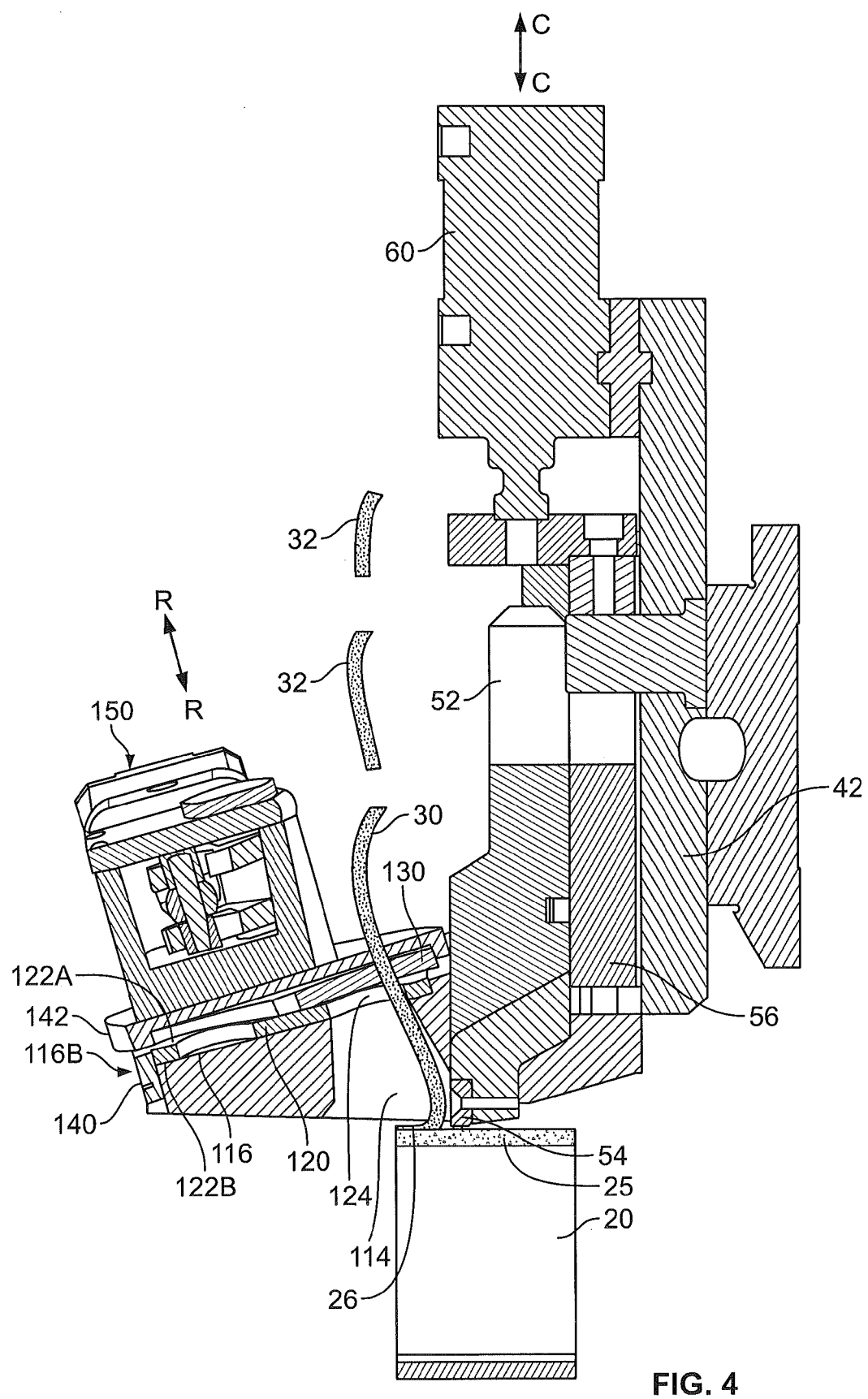
FIG. 4 is a cross-sectional view of a chopper apparatus forming a part of the external weld bead removal system of FIG. 1, taken along the line 4-4 of FIG. 3.

With reference to FIGS. 3-7, an external weld bead removal system 10 according to embodiments of the invention is shown therein. As shown in FIG. 3, the system 10 includes a stand 40, a primary base 42, a weld bead cutting apparatus or assembly 50, and a chopper apparatus or assembly 100.

Figure 2:
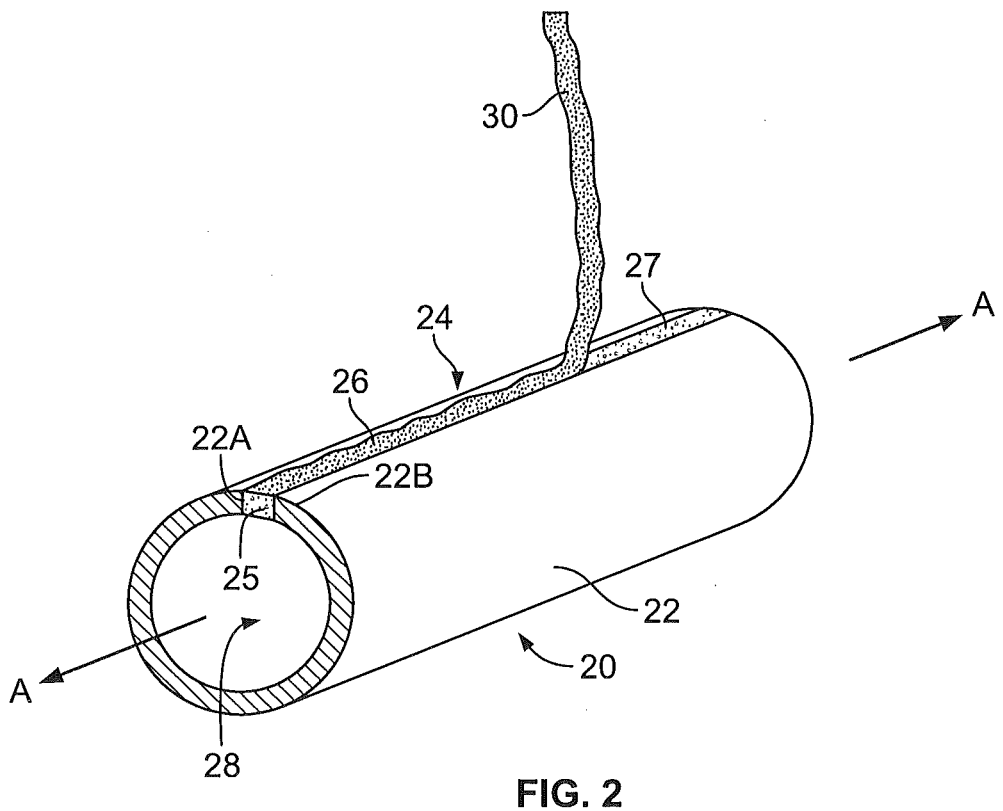
FIG. 2 is a perspective view of a tube partially formed using the tube fabrication system of FIG. 1, wherein an external weld bead thereof is partially removed.

The system 10 can be used to remove a longitudinally extending, external excess weld bead 26 from a welded tube 20. More particularly and with reference to FIG. 2, the tube 20 has a cylindrical side wall 22 that has been formed or rolled (e.g., from metal sheet stock) and welded so that opposed longitudinal edges 22A, 22B of the side wall 22 are joined by a weld 25 at a lengthwise seam 24. The tube 20 may form a longitudinally extending inner passage 28 and has a longitudinal tube axis A-A extending generally parallel with the seam 24 and weld bead 26.

According to some embodiments, the tube side wall 22 is formed (e.g., rolled) and fed downstream and the weld 25 (including the weld bead 26) is formed upstream of the system 10 and fed to the system 10 in a continuous process. The weld bead 26 is cut, trimmed or scarfed from the tube 20 by the system 10 (more particularly, the cutting assembly 50) as an accumulated weld based ribbon 30 and the ribbon 30 is chopped into pieces 32 by the chopper assembly 100. A remaining weld portion 27 remains on the tube 20 to bond the edges 22A, 22B and complete the tube 20.

For example, in some embodiments and with reference to FIG. 1, the system 10 forms a part of a tube fabrication system or line 3. In the system 3, a continuous, elongate tube form or tube side wall 22 is formed by a tube forming station or apparatus 4. The tube side wall 22 is fed downstream to a welding station or apparatus 6, which forms the continuous weld 25 between the opposed longitudinal edges of the tube side wall 22, thereby forming the tube 20. The tube 20 is fed downstream to the system 10. A scarfed tube 29 and chopped pieces 32 are generated by or exit the system 10. U.S. Published Patent Application No. 2013/0098220 to Seminew and U.S. Pat. No. 7,490,391 to Chezzi et al., which are incorporated herein by reference, describe apparatus and methods for forming a tube and scarfing an external weld bead in a similar manner. The apparatus can be used for tubes of different diameters; however, in practice, only one such tube would be run through the apparatus at a time.

The primary base 42 (FIG. 3) is coupled to the stand 40 by rails 44, enabling the base 42 to be selectively translated left and right along a horizontal adjustment axis B-B relative to the tube 20. The cutting assembly 50 and the chopper assembly 100 are affixed to the base 42 so that they can likewise be adjusted along the axis B-B by movement of the base 42.

The cutting apparatus 50 (FIG. 4) includes a tool holder 52 mounted on a mount plate 56 for movement therewith. A scarfing or cutting tool 54 is affixed to the tool holder 52 for movement therewith. The cutting tool 54 has a terminal cutting edge 54A (e.g., a sharp edge). The cutting tool 54 may be a carbide blade, for example. The mount plate 56 is in turn slidably mounted on the primary base 42 by guide rails 58 to permit selective translation along a vertical adjustment axis C-C relative to the tube 20. A tool positioning actuator 60 (e.g., a hydraulic actuator) is affixed to the base 42 and connected to the tool holder 52 by an actuator shaft 62 to move and position the tool holder 52 along the axis C-C as desired. In operation, the actuator 60 may be used to raise the tool 54 away from the weld bead 26 and return the tool 54 into the weld bead 26 to avoid cutting the weld at a cross-connect (i.e., a weld joining two lengths of tube end to end).

The chopper apparatus 100 includes a base 110, a blade retainer 140, a bottom blade member 120, a top blade member 130, a cover 142, a pressure roller bearing 144, and a drive assembly 150. An exit chute may also be provided to receive the cut segments 32.

The base 110 (FIGS. 3-5) includes a platform 112 that is affixed to the primary base 42. A guide opening or chute 114 is defined in the base 110 and, in some embodiments and as illustrated, is tapered in a direction away from the tool 54. A blade cavity 116 is defined in the top side of the base 110 and surrounded by sidewalls 116A and a side access slot 116B. The slot 116B is closed by the removable blade retainer 140.

The bottom blade member 120 (FIGS. 4-5) is seated in the cavity 116 and serves as a fixed lower cutting blade. The blade member 120 has opposed first and second sides 122A and 122B. Four openings 124 extend through the blade member 120 from side 122A to side 122B. One of the openings 124' is aligned with the guide chute 114. Each opening 124 has a first cutting edge 128 and an opposing second cutting edge 129 surrounding the opening 124.

According to some embodiments, the cutting edges 128, 129 are sharp. In some embodiments, the cutting edges 128, 129 have a thickness in the range of from about 0.25 inch to 0.5 inch.

The blade member 120 may be formed of any suitable material. According to some embodiments, the blade member 120 is formed of steel (e.g., D2 or S7 tool steel). According to some embodiments, the blade member 120 is monolithic.

According to some embodiments, each of the openings 124 has a diameter D1 (FIG. 5) in the range of from about 1.5 inches to 2.5 inches.

The top blade member 130 (FIGS. 4 and 5) includes a hub 132 and four integral, equidistantly spaced apart legs 136 extending radially outwardly from the hub 132. A drive transmission feature or socket 134 is defined in the hub 132. Each leg 136 has a first set of circumferentially opposed cutting edges 138A, 138B (on a first side 133A of the member 130) and a second set of circumferentially opposed cutting edges 139A, 139B (on an axially opposed second side 133B of the member 130). The top blade member 130 serves as a moving, upper cutting blade in cooperation with the bottom blade member 120.

In some embodiments, the cutting edges 138A, 138B are sharp. In some embodiments, the cutting edges 138A, 138B have a length in the range of from about 1.5 inches to 3 inches.

The top blade member 130 may be formed of any suitable material. According to some embodiments, the top blade member 130 is formed of steel (e.g., D2 or S7 tool steel). According to some embodiments, the blade member 130 is monolithic.

The drive assembly 150 (FIGS. 6 and 7) includes a housing 152, a chopper actuator 154 (e.g., a hydraulic actuator), a rotor 160, and a connecting pin 158. The actuator 154 is configured to forcibly drive or reciprocate a drive shaft 156 thereof in an extension direction E and an opposing retraction direction F along a stroke axis G-G parallel with a shaft axis D-D of the shaft 156.

The rotor 160 has upper and lower axle posts 162 and 164 rotatably seated or journalled in the housing 152 to permit the rotor 160 to rotate about a pivot axis K-K. Bushings 167 may be provided between the posts 162, 164 and the housing 152. The rotor 160 includes a lever arm 166 extending radially outwardly therefrom. A pin slot 168 is defined in the lever arm 166 and has a slot axis I-I. The connecting pin 158 is secured to the distal end of the shaft 156 and slidably captured in the slot 168.

The drive assembly 150 is mounted on the remaining components of the chopper apparatus 100 such that the cover 142 and the pressure roller bearing 144 are captured between the top blade member 130 and the housing 152 and the end of the lower axle post 164 is received and keyed into the socket 134. This subassembly in turn captures the bottom blade member 120 between the top blade member 130 and the platform 112 with the sides 122A and 133A of the blade members 120, 130 in intimate contact. According to some embodiments, the top blade member 130 is axially loaded against the bottom blade member 120. According to some embodiments, the load applied to the bottom blade member 120 by the top blade member 130 is in the range of from about 300 psi to 1000 psi.

The system 10 may be used as follows in accordance with methods of the present invention. A tube 20 is formed, welded and fed to the bead cutting assembly 50 such that the cutting tool 54 scarfs (i.e., continuously removes by planing or cutting) the external weld bead 26 from the longitudinal seam 24, thereby producing a continuous excess weld bead ribbon 30. The ribbon 30 is routed up through the chute 114 and the corresponding opening 124 in the bottom blade member 120. The ribbon 30 is pushed by the advancing tube 20 to feed or advance the ribbon 30 through the opening 124.

Figure 5:
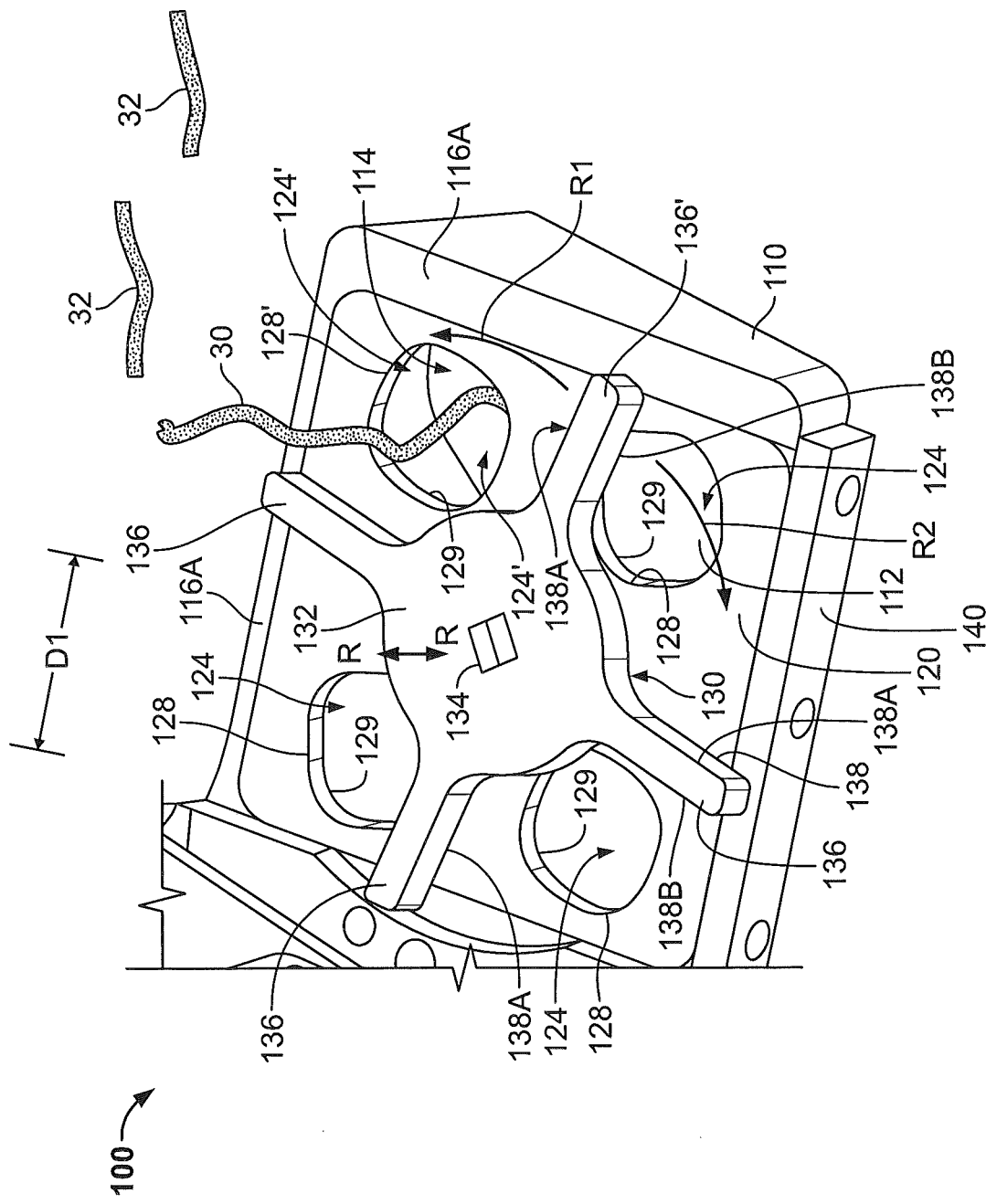
FIG. 5 is an enlarged, fragmentary, perspective view of the chopper apparatus of FIG. 4.
Figure 6:
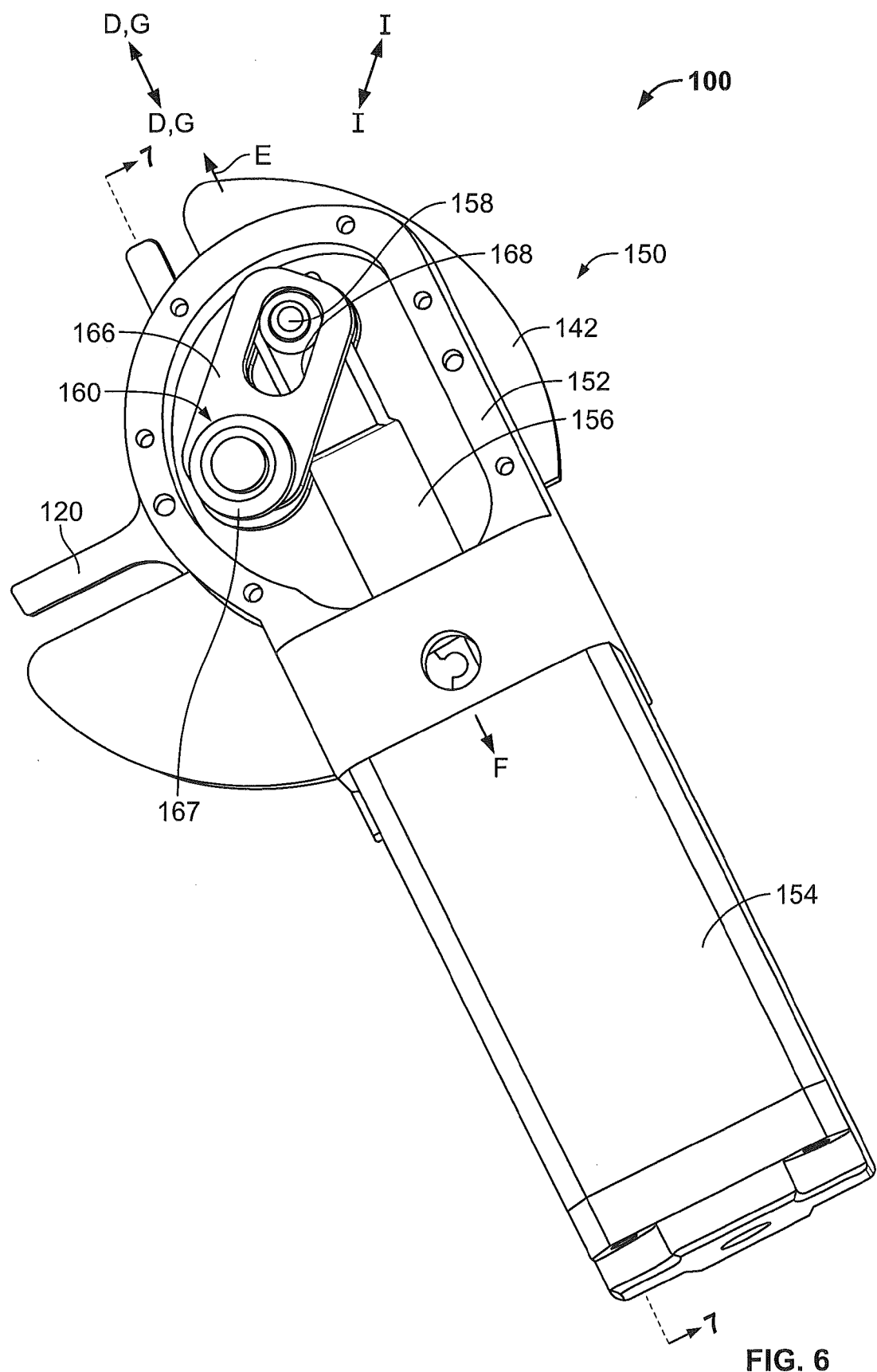
FIG. 6 is an enlarged, fragmentary, perspective view of the chopper apparatus of FIG. 4.
Figure 7:
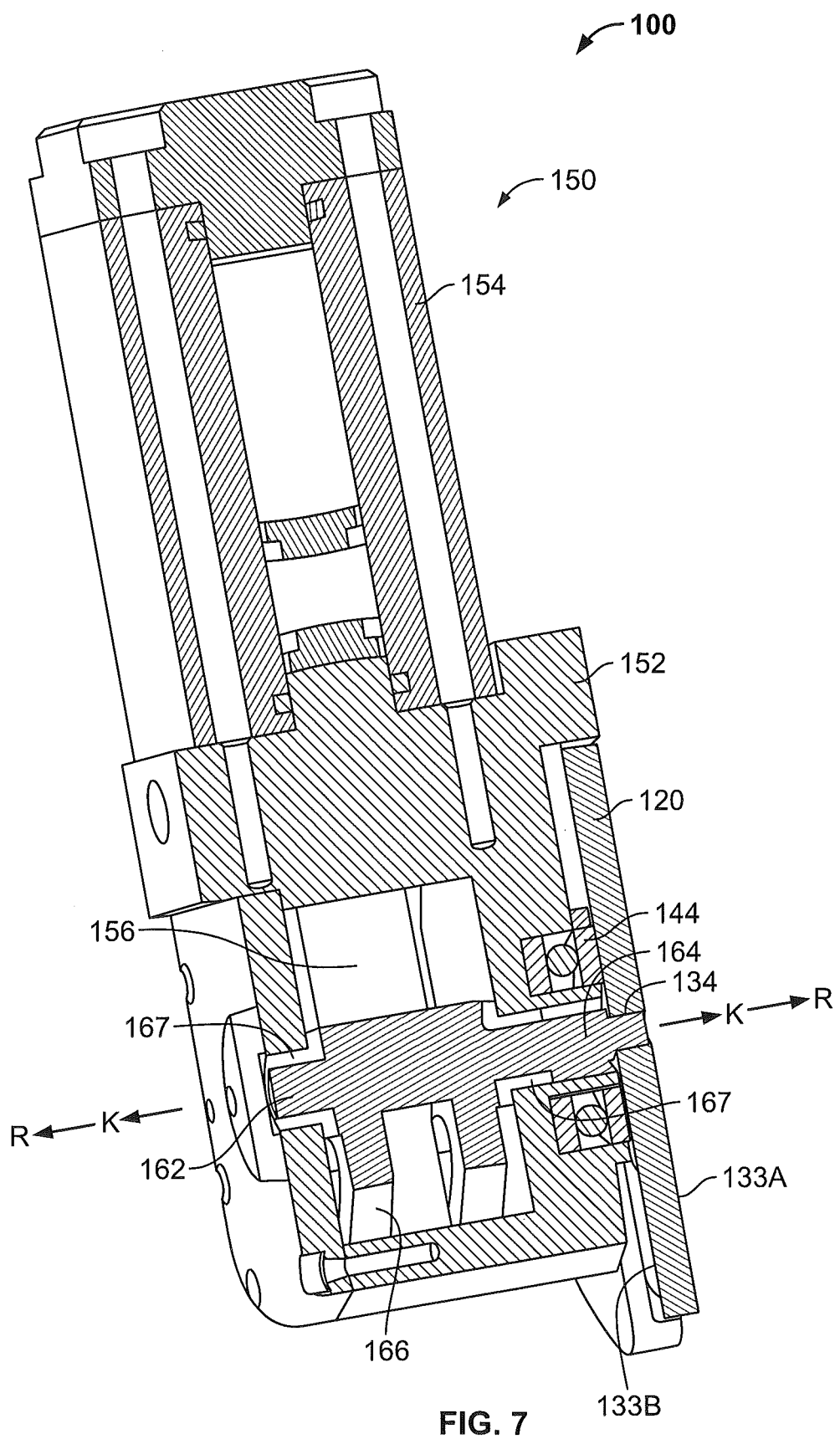
FIG. 7 is a cross-sectional view of the chopper apparatus of FIG. 4, taken along the line 7-7 of FIG. 6.

With reference to FIG. 5, the actuator 154 forcibly reciprocates the shaft 156, and thereby the connecting pin 158, along the stroke axis G-G in the stroke directions E, F. The actuator 154 thereby pushes and pulls the lever arm 166, which rotates the rotor 160 and the top blade member 130 in opposed rotation directions R1 and R2 about a rotation axis R-R. According to some embodiments, the legs 136 rotate through 90 degrees for each stroke (i.e., 90 degrees counterclockwise in the extension stroke, and returning 90 degrees clockwise in the retraction stroke).

The connecting pin 158 slides within the slot 168 through each stroke to accommodate the variation in spacing between the end of the shaft 156 and the rotor 160. In this way, the lever arm 166, guide slot 168, and connecting pin 158 serve as a linkage coupling the shaft 156 to the top blade member 130. The elongate slot 168 reduces or eliminates lateral loads (i.e., transverse to the stroke axis G-G) that may otherwise be applied to the shaft 156 by the rotating rotor 160. According to some embodiments, the slot axis I-I (FIG. 6) is substantially perpendicular to the stroke axis G-G when the shaft 156 is at half-stroke, and is oriented at an angle of about 45 degrees with respect to the stroke axis G-G when the shaft 156 is at each of its stroke endmost positions (e.g., FIG. 6).

As the legs 136 are rotated and counter-rotated in directions R1 and R2 about the rotation axis R-R as described above, the leg 136' proximate the chute 114 correspondingly rotates and counter rotates across the bottom blade member opening 124' that is positioned over the chute 114. That is, the rotation of the legs 136 (and thereby their cutting edges) is centered about the rotation axis R-R of the rotor 160, which serves as the central device axis. On the R1 rotation stroke, the leading cutting edge 138A of the leg 136' cooperates with the cutting edge 128' of the opening 124° to sever (e.g., by scissor action) the ribbon 30 at the cutting edge interface. On the R2 rotation stroke, the opposite cutting edge 138B, now leading, cooperates with the opposing portion of the cutting edge 128' of the opening 124' to sever the advancing ribbon 30 at a second location along the length of the ribbon 30. This cutting action is periodically repeated to periodically cut the advancing ribbon 30 into a plurality of pieces or segments 32 of desired length. The cut segments 32 can fall out of the chopper assembly 100 through the exit chute 146. In some embodiments, each segment 32 has a length in the range of from about 4 inches to 12 inches.

Each blade member 120, 130 provides multiple sets of cutting edges and the chopper apparatus 100 is configured so that new edges can be employed by adjusting the blade members 120, 130 rather than requiring the cutting edges be sharpened or the blade members 120, 130 be replaced. In this way, the chopper apparatus 100 can reduce operating costs.

More particularly, the bottom blade member 120 can be removed from the cavity 116 by removing the retainer 140 and sliding the blade member 120 out through the slot 116B. The blade member 120 can then be rotated and/or flipped over and re-inserted into the cavity 116 and secured by the retainer 140. By rotating the blade member 120, the operator can align any one of the four openings 124 with the chute 114. By flipping the blade member 120, the operator can position the second blade edges 129 on top to interface with the top blade member 130 and cut the ribbon 30. Thus, it will be appreciated that there are eight different configurations available for positioning the bottom blade member 120, each of which positions a different one of the eight cutting edges 128, 129 to serve as the effective cutting edge.

The top blade member 130 can similarly be repositioned in eight different positions to present each of eight different sets of cutting edges (each leg 136 having a first set of opposed cutting edges 138A, 138B on one side and a second set of opposed cutting edges 139A, 139B on the other side). This can be accomplished by removing the top blade member 130 from axle post 164, rotating and/or flipping the top blade member 130, and replacing the re-oriented top blade member on axle post 164.

The mounting relationship between the chopper apparatus 100 and the bead cutting apparatus 50 can provide a number of advantages. Notably the chopper apparatus 100 as illustrated is a modular unit secured to the primary base 42, not directly to the bead cutting apparatus 50. As such, the chopper apparatus 100 will move laterally with the bead cutting apparatus 50, but the tool holder 52 will move up and down independently of the chopper apparatus 100. Because the chopper apparatus 100 does not move up and down with the cutting apparatus 50, the number of moving parts is reduced and reliability is improved. The independently secured chopper apparatus 100 can be installed on bead cutting apparatus of different configurations and sizes. The mounting arrangement of the chopper apparatus 100 tends to isolate the tool holder 52 and the tube 20 from vibrations generated in or by the chopping apparatus 100 by the chopping operation, thereby reducing the risk such vibrations may compromise the quality of the weld bead removal.

Figure 8:
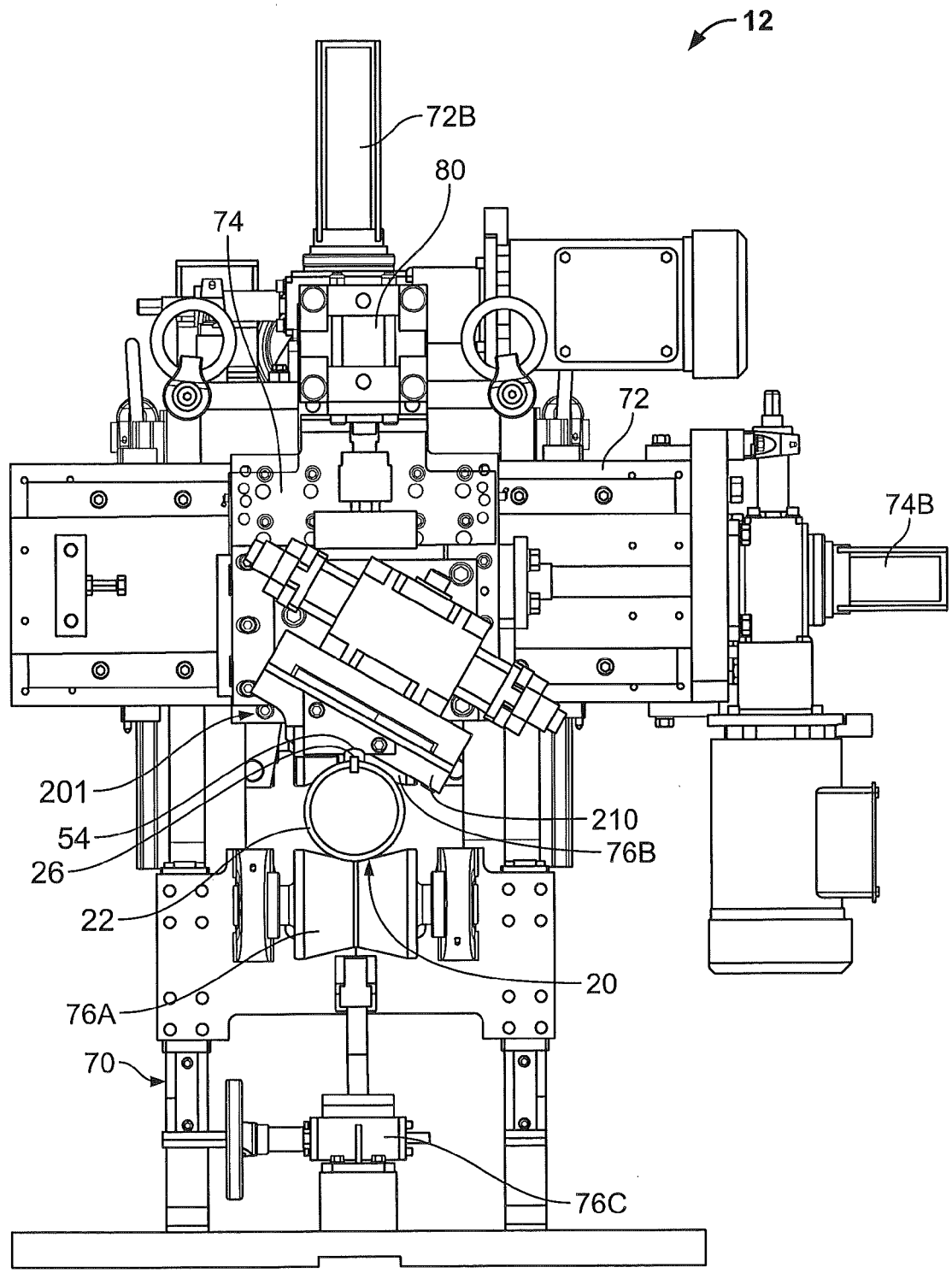
FIG. 8 is a front view of an external weld bead removal system according to further embodiments of the present invention.
Figure 9:
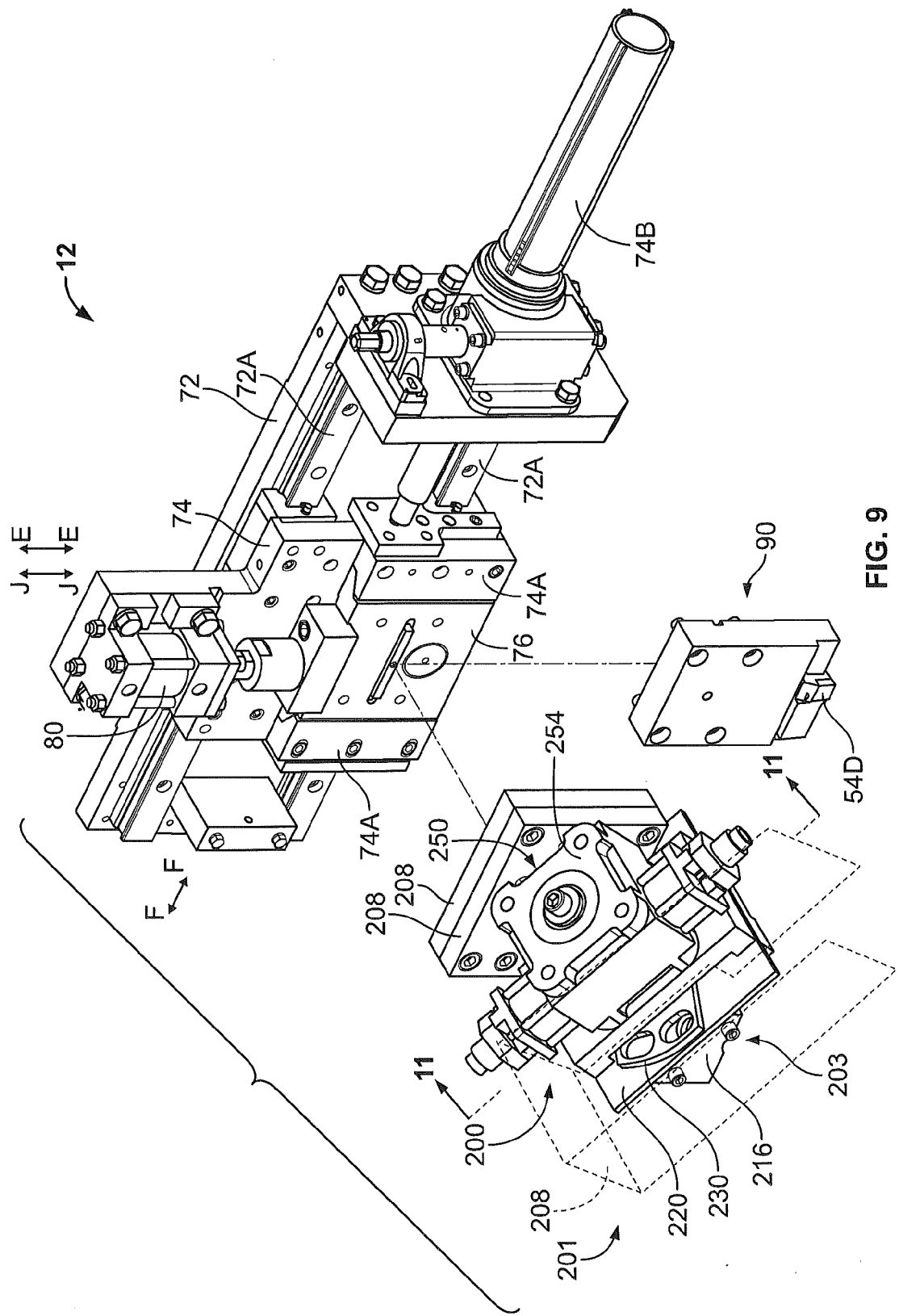
FIG. 9 is an exploded, fragmentary, perspective view of the external weld bead removal system of FIG. 8.
Figure 10:
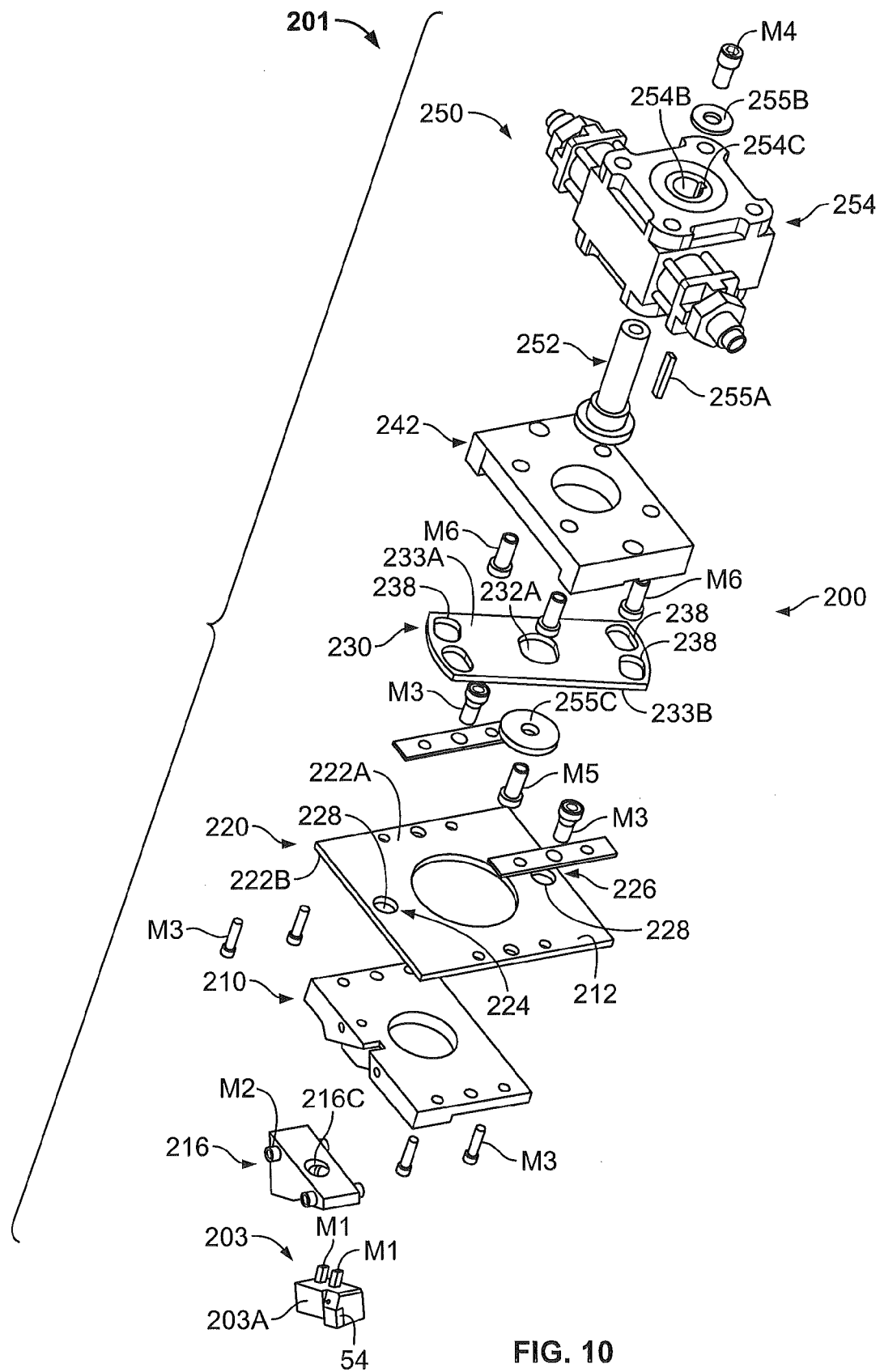
FIG. 10 is an exploded, fragmentary, perspective view of a cutting/chopper apparatus forming a part of the external weld bead removal system of FIG. 8.

With reference to FIGS. 8-14, an external weld bead removal system 12 according to further embodiments of the invention is shown therein. As shown in FIGS. 8 and 9, the system 12 includes a cutting/chopper apparatus 201, a stand 70, a primary base 72, a secondary base 74, and a mount plate 76. The system 12 can further include a weld bead cutting apparatus or module 90 that can be interchanged and installed in place of the chopper apparatus 201.

A grooved front guide roller 76A (FIG. 8) is mounted on the stand 70 and provided with a roller adjusting mechanism 76C to selectively adjust the vertical position of the roller 76A. A grooved rear guide roller 76B is also mounted on the stand 70 downstream of the roller 76A. The rollers 76A, 76B are provided to position, support and stabilize the tube 20 relative to the cutting tool 54.

With reference to FIG. 9, the primary base 72 is mounted on the stand to permit relative vertical movement of the primary base 72 along a vertical axis E-E. The secondary base 74 is slidably mounted and retained on horizontal rails 72A of the primary base 72 to permit movement of the secondary base 74 along a horizontal axis F-F. The mount plate 76 is slidably mounted and retained between vertical rails 74A of the secondary base 74 to permit relative movement along a vertical axis J-J.

A vertical adjustment actuator 72B (e.g., a screw jack; FIG. 8) is provided to selectively adjust the vertical position of the primary base 72 and the components mounted thereon relative to the stand 70 (and thereby the rollers 76A, 76B and the tube 20). A horizontal adjustment actuator 74B (e.g., a screw jack) is provided to selectively adjust the horizontal position of the secondary base 74 and the components mounted thereon relative to the primary base 72 (and thereby the rollers 76A, 76B and the tube 20, as well).

The cutting/chopper module 201 is mounted on the mount plate 76 for movement therewith. The cutting/chopper module 201 includes a chopper apparatus 200 and an integral weld bead cutting apparatus 203.

The chopper apparatus 200 includes a pair of coupling plates 208, a base 210, a weld bead ribbon guide 216, a bottom blade member 220, a top blade member 230, a support frame or cover 242, and a drive assembly 250.

The coupling plates 208 are fixedly and removably and replaceably bolted to the mount plate 76. The base 210 is in turn fixedly secured (e.g., by bolts) to the coupling plates 208. The base 210 includes a platform surface 212.

The cutting assembly 203 includes a tool holder 203A fixedly and removably and replaceably mounted on the base 210 by bolts M1. The cutting assembly 203 further includes a cutting tool 54 (having a cutting edge 54A) removably and replaceably mounted on the tool holder 203A.

The ribbon guide 216 is fixedly and removably and replaceably bolted to the base 210 by bolts M2. The ribbon guide 216 defines a guide chute 216C (FIG. 13) extending from an inlet end opening 216A to an outlet end opening 216B. The inlet end opening 216A is located proximate the cutting edge 54A. The outlet end opening 216B is located proximate the platform 212. According to some embodiments, each of the openings 216A, 216B has a diameter in the range of from about 1.5 inches to 2.5 inches.

The cover 242 overlies the bottom blade member 220. The cover 242 and the bottom blade member 220 are fixedly and removably and replaceably bolted to the base 210 on the platform 212 by bolts M3. The top blade member 230 is interposed between the bottom blade member 220 and cover 242 and resides in a slot 242A defined by the cover 242 which permits the top blade member 230 freedom of movement.

The drive assembly 250 includes a drive actuator 254 (e.g., a hydraulic actuator), a drive shaft 252, a key 255A, an upper washer 255B, an upper bolt M4, a lower washer 255C, and a lower bolt M5. The drive actuator 254 includes a housing 254A secured to the cover 242 by bolts M6. The drive actuator 254 also includes a rotating drive cylinder 254B having a key slot 254C defined therein. The drive shaft 252 is operatively coupled to the drive cylinder 254B for rotation therewith by the key 255A, which resides in the key slot 254C and a key slot 252C in the shaft 252.

Figure 11:
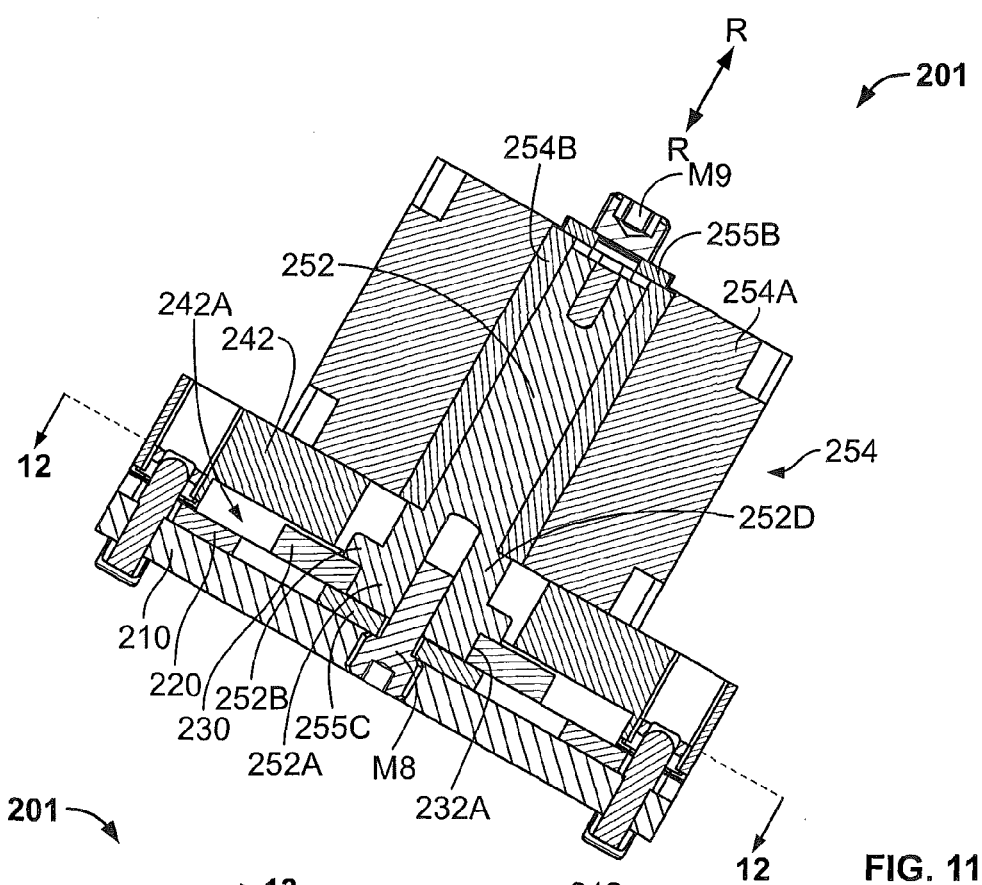
FIG. 11 is a cross-sectional view of the cutting/chopper apparatus of FIG. 9, taken along the line 11-11 of FIG. 9.

With reference to FIG. 11, the lower end of the drive shaft 252 includes a keyed drive head 252A that is seated in a complementary drive socket 232A defined in the top blade member 230. The top blade member 230 is tightly captured between a lower annular flange 252B of the drive shaft 252 and the washer 255C by a bolt M8.

At its upper end, the drive shaft 252 is secured against vertical movement by the washer 255B and the bolt M9. At its lower end, the drive shaft 252 is secured against vertical movement by an upper annular flange 252D. Thus, the top blade member 230 is vertical fixed relative the bottom blade member 220.

The bottom blade member 220 has opposed first and second sides 222A and 222B. Two openings 224, 226 extend through the blade member 220 from side 222A to side 222B. The opening 224 is aligned with the chute outlet opening 216B. Each opening 224, 226 has a first cutting edge 228 and an opposing second cutting edge 229 surrounding the opening 224, 226.

The blade member 220 may be formed of any suitable material. According to some embodiments, the blade member 220 is formed of steel (e.g., D2 or S7 tool steel). According to some embodiments, the blade member 220 is monolithic.

According to some embodiments, each of the openings 224, 226 has a diameter D2 (FIG. 14) in the range of from about 1.5 inches to 2.5 inches.

The top blade member 230 includes a hub 232 and two integral, diametrically opposed wings or legs 235 extending radially outwardly from the hub 232. The aforementioned drive transmission feature or socket 232A is defined in the hub 232. One leg 235 has a first set of side by side, circumferentially spaced apart cutting openings 234A, 234B, and the other leg 235 has a second set of side by side, circumferentially spaced apart cutting openings 236A, 236B. Each opening 234A, 234B, 236A, 236B has a first circumferential cutting edge 238 (on a first side 233A of the blade member 230) and a second circumferential cutting edge 239 (on an axially opposed second side 233B of the blade member 230). The top blade member 230 serves as a moving, upper cutting blade in cooperation with the bottom blade member 220.

In some embodiments, the cutting edges 238, 239 are sharp. In some embodiments, the cutting edges 238, 239 have a thickness in the range of from about 0.25 inch to 0.5 inch.

The top blade member 230 may be formed of any suitable material. According to some embodiments, the top blade member 230 is formed of steel (e.g., D2 or S7 tool steel). According to some embodiments, the blade member 230 is monolithic.

According to some embodiments, each of the openings 234A, 234B, 236A, 236B has a major diameter D3 (FIG. 12) in the range of from about 1 inch to 2.5 inches.

The drive shaft 252, which is affixed to the base 210 by the housing 254A and the cover 242, captures the bottom blade member 220 between the top blade member 230 and the platform 212 with the sides 222A and 233B of the blade members 220, 230 in intimate contact. According to some embodiments, the top blade member 230 is axially loaded against the bottom blade member 220. According to some embodiments, the load applied to the bottom blade member 220 by the top blade member 230 is in the range of from about 300 psi to 1000 psi.

The system 12 may be used as follows in accordance with methods of the present invention. A tube 20 is formed, welded and fed to the bead cutting assembly 203 such that the cutting tool 54 scarfs (i.e., continuously removes by planing or cutting) the external weld bead 26 from the longitudinal seam 24, thereby producing a continuous excess weld bead ribbon 30. The ribbon 30 is routed up through the guide chute 216C of the ribbon guide 216 and the corresponding opening 224 in the bottom blade member 220, which is aligned with the outlet opening 216B. The relative positions of the tube 20 and the cutting tool 54 can be adjusted using the actuators 72B, 74B, 76C.

Figure 12:
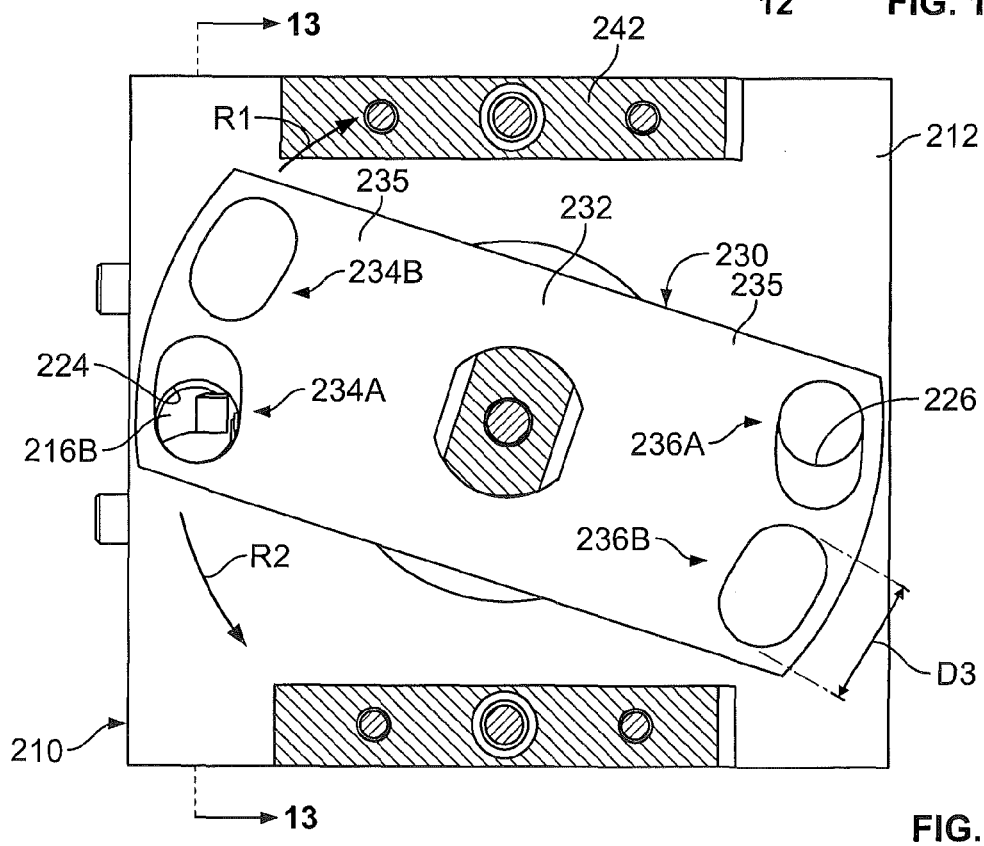
FIG. 12 is a cross-sectional view of the cutting/chopper apparatus of FIG. 9, taken along the line 12-12 of FIG. 11.
Figure 13:
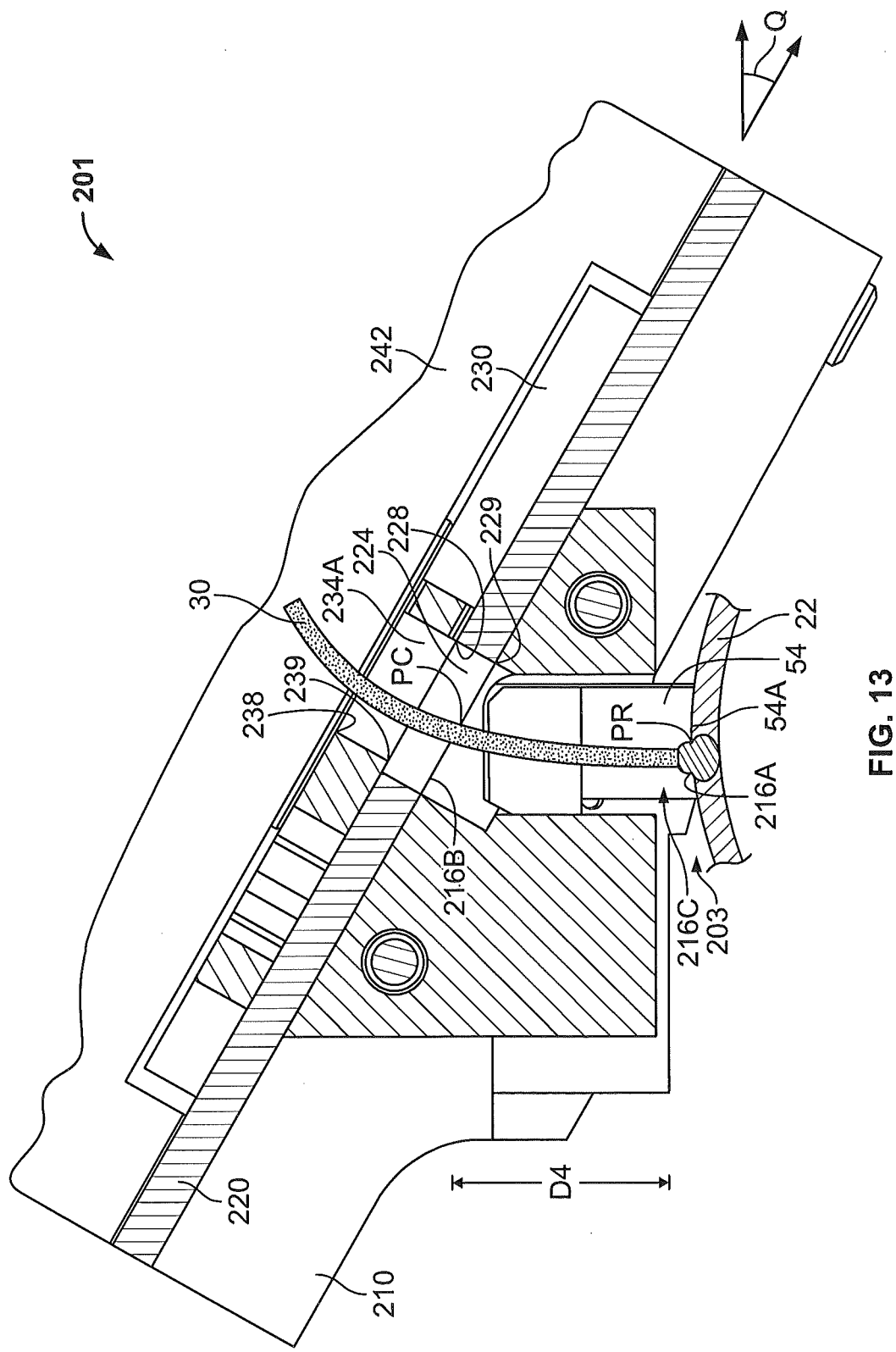
FIG. 13 is a fragmentary, cross-sectional view of the cutting/chopper apparatus of FIG. 9, taken along the line 13-13 of FIG. 12.
Figure 14:
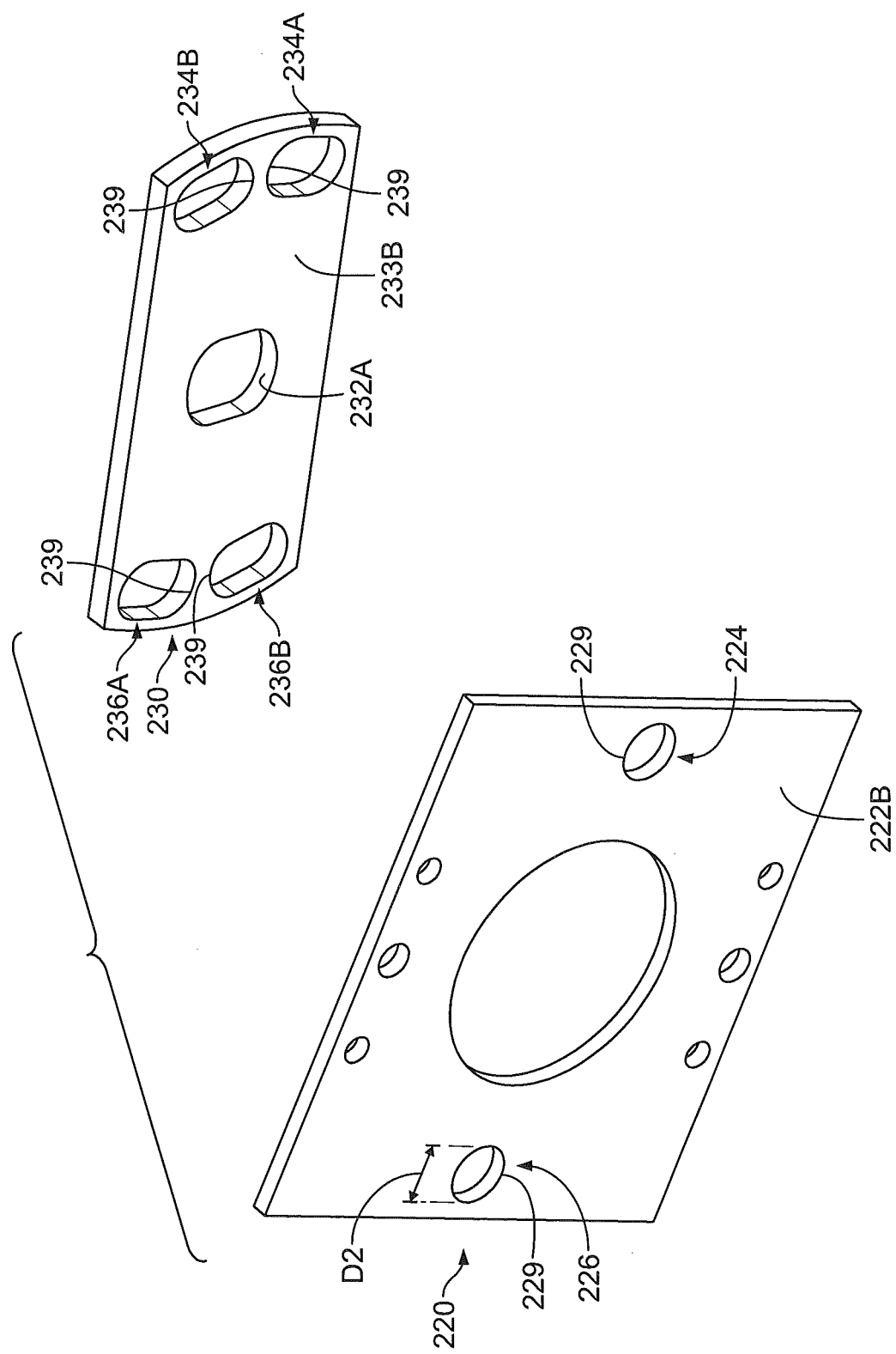
FIG. 14 is a bottom perspective view of bottom and top blade members forming a part of the cutting/chopper apparatus of FIG. 9.

With reference to FIG. 12, the actuator 254 forcibly and reciprocatingly rotates the shaft 252, and thereby the top blade member 230 in opposed rotation directions R1 and R2 about a rotation axis R-R. According to some embodiments, the legs 235 rotate through 15 degrees in each direction R1, R2 for each cycle (i.e., 15 degrees counterclockwise, and returning 15 degrees clockwise).

As the legs 235 are rotated and counter-rotated in directions R1 and R2 about the rotation axis R-R as described above, the leg 235 proximate the chute outlet 216B correspondingly rotates and counter rotates across the bottom blade member opening 224 that is positioned over the chute 216 to alternatingly position the top blade openings 234A and 234B over the bottom blade member opening 224. That is, the rotation of the leg 235 (and thereby the cutting edges 239 of the openings 234A and 234B) is centered about the rotation axis R-R of the shaft 252, which serves as the central device axis. On the R1 rotation stroke, the cutting edge 239 of the top blade member opening 234B cooperates with the cutting edge 228 of the bottom blade member opening 224 to sever (e.g., by scissor action) the ribbon 30 at the cutting edge interface. On the R2 rotation stroke, the cutting edge 239 of the top blade member opening 234A, now leading, cooperates with the cutting edge 228 of the bottom blade member opening 224 to sever the advancing ribbon 30 at a second location along the length of the ribbon 30. This cutting action is periodically repeated to periodically cut the advancing ribbon 30 into a plurality of pieces or segments 32 of desired length. According to some embodiments, the chopper apparatus 200 waits a prescribed indexing time period or periods (e.g., 0.05 seconds) between each rotation in directions R1, R2 in order to permit a prescribed or desired length of the ribbon 30 to advance or index between cut strokes. The cut segments 32 can fall out of the chopper assembly 100 through an exit chute 208 (shown in dashed lines in FIG. 9). In some embodiments, each segment 32 has a length in the range of from about 4 inches to 12 inches.

Each blade member 220, 230 provides multiple sets of cutting edges and the chopper apparatus 200 is configured so that new edges can be employed by adjusting the blade members 220, 230 rather than requiring the cutting edges be sharpened or the blade members 220, 230 be replaced. In this way, the chopper apparatus 200 can reduce operating costs.

More particularly, the bottom blade member 220 can be removed from the base 210 by removing the cover 242 and bolts M3 and lifting the blade member 220 from the platform 212. The blade member 220 can then be rotated and/or flipped over and re-placed onto the platform 212 and secured by cover 242 and bolts M3. By rotating the blade member 220, the operator can align either of the two openings 224, 226 with the chute opening 216B. By flipping the blade member 220, the operator can position the second blade edges 229 on top to interface with the top blade member 230 and cut the ribbon 30. Thus, it will be appreciated that there are four different configurations available for positioning the bottom blade member 220, each of which positions a different one of the four cutting edges 228, 229 to serve as the effective cutting edge.

The top blade member 230 can similarly be repositioned in four different positions to present each of four different sets of cutting edges (each leg 235 having a first set of cutting edges 238 on one side and a second set of cutting edges 239 on the other side). This can be accomplished by removing the top blade member 230 from axle post or shaft 252, rotating and/or flipping the top blade member 230, and replacing the re-oriented top blade member on shaft 252.

Over time, the ribbon 30 may wear, cut or otherwise damage the ribbon guide 216, which may affect the performance of the chopper apparatus 200. According to some embodiments, the operator can remove the worn or damaged ribbon guide 216 and re-install a new ribbon guide 216 in its place using bolts M2. The chute 216 can also be removed and replaced with a chute 216 having a different funnel geometry to adjust for different tube mills.

As noted above, the actuators 72B, 74B, 76C can be used to selectively position the tube 20 and cutting tool 54. Additionally, the tool positioning actuator 80 can be used to vertically lift the module 201 (including the cutting tool 54) a relatively short distance or excursion (e.g., 0.75 to 1 inch) away from the tube 20 and then lower the module 201 and cutting tool 54 back into scarfing engagement with the tube. This operation may be used to lift the cutting tool 54 away from an advancing cross-weld on the tube 20.

The modular configuration and mounting arrangement of the cutting/chopper module 201 can enable the operator to conveniently reconfigure the system 12 as desired. For example, the cutting/chopper module 201 can be removed from the mount plate 76 and replaced with an alternative scarfing module 90 bolted to the mount plate 76. The exemplary scarfing module 90 includes a cutting tool 54D but not a scarf ribbon chopper.

According to some embodiments, the distance D4 (FIG. 13) between the scarf removal point PR (i.e., the location of engagement between the cutting edge 54A and the tube 20) and the ribbon chopping point PC (i.e., the location of the interface between the operative cutting edges 228 and 239 of the bottom and top blade members 220, 230) is in the range of from about 1 inch to 3 inches and, in some embodiments, from about 1.5 inches to 2.5 inches. Applicants have discovered that this spacing arrangement and specification provide the ribbon 30 to the chopper apparatus 200 at a length that enables more trouble-free operation. Shorter and longer lengths of feed ribbon may induce ribbon jams.

According to some embodiments, the top surface of the bottom blade member 120 is oriented at angle Q (FIG. 13) with respect to horizontal to facilitate falling of the cut segments 32 away from the cutting point PC.

Typically, the scarf being cut will shrink at a rate of three to four times the length of the tube being cleaned, allowing for less frequent operation of the chopper.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. An external weld bead removal system for removing and chopping an external weld bead from a tube, the external weld bead removal system comprising:
   a weld bead cutting apparatus including a cutting tool operative to cut and remove an external weld bead from a tube; and
   a weld bead chopper apparatus for chopping the removed external weld bead, the weld bead chopper apparatus including:
      a first blade member;
      a second blade member mounted adjacent the first blade member, the second blade member including an opening extending therethrough for receiving the removed external weld bead, the opening defining a cutting edge; and
      a chopper actuator operable to forcibly rotate the first blade member about a rotation axis relative to the second blade member such that the first and second blade members cooperatively cut the removed external weld bead into smaller weld bead segments as the removed external weld bead is advanced through the chopper apparatus.

2. The external weld bead removal system of claim 1 configured such that the second blade member remains stationary when the first blade member is forcibly rotated by the actuator to cut the removed external weld bead.

3. The external weld bead removal system of claim 1 wherein the chopper actuator is operable to repetitively reciprocate the first blade member in opposed rotation and counter-rotation directions about the rotation axis relative to the second blade member such that the first and second blade members cooperatively cut the removed external weld bead into the smaller weld bead segments as the removed external weld bead is advanced through the chopper apparatus.

4. The external weld bead removal system of claim 1 wherein the first blade member is rotatively driven at the rotation axis.

5. The external weld bead removal system of claim 1 wherein:
   the chopper actuator includes a drive shaft that linearly reciprocates along a stroke axis;
   the weld bead chopper apparatus includes a linkage coupling the drive shaft to the first blade member; and
   the linkage converts the linear movement of the drive shaft to rotation of the first blade member about the rotation axis.

6. The external weld bead removal system of claim 5 wherein the linkage includes an elongate guide slot to reduce or eliminate lateral loads on the drive shaft as the drive shaft travels through its stroke path along the stroke axis.

7. The external weld bead removal system of claim 1 wherein:
   the first blade member includes first and second sets of cutting edges; and
   the first blade member can be alternatively positioned to cut the removed external weld bead using either the first set of cutting edges or the second set of cutting edges.

8. The external weld bead removal system of claim 7 wherein the first and second sets of cutting edges are on opposed sides of the first blade member.

9. The external weld bead removal system of claim 7 wherein the first and second sets of cutting edges are on the same side of the first blade member and circumferentially spaced apart about the rotation axis.

10. The external weld bead removal system of claim 1 wherein:
    the second blade member includes first and second sets of cutting edges, one of the first set or the second set including the cutting edge defined by the opening; and
    the second blade member can be alternatively positioned to cut the removed external weld bead using either the first set of cutting edges or the second set of cutting edges.

11. The external weld bead removal system of claim 10 wherein the first and second sets of cutting edges are on opposed sides of the second blade member, and wherein one of the first set or the second set defines the opening extending through the second blade member, and the other of the first set or the second set defines a further opening extending through the second blade member.

12. The external weld bead removal system of claim 10 wherein:
    one of the first and second sets of cutting edges defines the opening extending through the second blade member, which opening is a first opening,
    the other of the first and second sets of cutting edges defines a second opening extending through the second blade member; and
    the first and second openings are circumferentially spaced apart about the rotation axis.

13. The external weld bead removal system of claim 1 including a guide chute configured to direct the removed external weld bead to a cutting region between the first and second blade members.

14. The external weld bead removal system of claim 13 wherein:
    the weld bead chopper apparatus includes a base supporting the second blade member; and
    the guide chute is removably and replaceably mounted on the base.

15. The external weld bead removal system of claim 1 including a tool positioning actuator operative to raise and lower the cutting tool and the weld bead chopper apparatus relative to the tube.

16. The external weld bead removal system of claim 1 wherein:
    the external weld bead removal system is configured such that the second blade member remains stationary when the first blade member is forcibly rotated by the actuator to cut the removed external weld bead;
    the chopper actuator is operable to repetitively reciprocate the first blade member in opposed rotation and counter-rotation directions about the rotation axis relative to the second blade member such that the first and second blade members cooperatively cut the removed external weld bead into smaller weld bead segments as the removed external weld bead is advanced through the chopper apparatus;
    the first blade member is rotatively driven at the rotation axis;
    the first blade member includes first, second, third and fourth sets of cutting edges;
    the first blade member can be alternatively positioned to cut the removed external weld bead using either the first set of cutting edges, the second set of cutting edges, the third set of cutting edges, or the fourth set of cutting edges;
    the second blade member includes first, second, third and fourth sets of cutting edges, one of the first, second, third, or fourth sets of cutting edges of the second blade member including the cutting edge defined by the opening;

the second blade member can be alternatively positioned to cut the removed external weld bead using either the first set of cutting edges of the second blade member, the second set of cutting edges of the second blade member, the third set of cutting edges of the second blade member, or the fourth set of cutting edges of the second blade member; and the external weld bead removal system includes a guide chute configured to direct the removed external weld bead to a cutting region between the first and second blade members.

* * * * *

UNITED STATES PATENT AND TRADEMARK OFFICE
CERTIFICATE OF CORRECTION

PATENT NO. : 9,713,831 B2  
APPLICATION NO. : 14/331917  
DATED : July 25, 2017  
INVENTOR(S) : Balta et al.

Page 1 of 1

It is certified that error appears in the above-identified patent and that said Letters Patent is hereby corrected as shown below:

On the Title Page

Item (56) References Cited: Please insert -- 4,600,180 7/1986 Abbey, III --

Item (56) References Cited: Please correct "5,192,013 A 3/1993 Abbey, III" to read -- 5,192,013 A 3/1993 Abbey, III et al. --

In the Specification

Column 7, Line 58: Please correct "124°" to read -- 124' --

Signed and Sealed this  
Fifth Day of June, 2018

Andrei Iancu  
*Director of the United States Patent and Trademark Office*